United States Patent
Skiba et al.

(10) Patent No.: US 7,870,655 B2
(45) Date of Patent: Jan. 18, 2011

(54) PROCESS OF ENDFORMING A TUBULAR ASSEMBLY

(75) Inventors: Terence Skiba, Marion County, FL (US); Randy Stanley, Marion County, FL (US); Herb Lemaster, Marion County, FL (US)

(73) Assignee: YH America, Inc., Versailles, KY (US)

( * ) Notice: Subject to any disclaimer, the term of this patent is extended or adjusted under 35 U.S.C. 154(b) by 849 days.

(21) Appl. No.: 11/769,316

(22) Filed: Jun. 27, 2007

(65) Prior Publication Data

US 2009/0000856 A1    Jan. 1, 2009

(51) Int. Cl.
- B23P 11/00 (2006.01)
- F16L 19/04 (2006.01)
- F16L 13/14 (2006.01)

(52) U.S. Cl. .............. 29/506; 29/507; 29/510; 29/511; 403/280; 403/282; 285/382.4

(58) Field of Classification Search ........... 29/506, 29/507, 510, 511; 403/280, 282; 60/403, 60/468; 285/124.3, 382.4, 205
See application file for complete search history.

(56) References Cited

U.S. PATENT DOCUMENTS

| | | | |
|---|---|---|---|
| 5,294,156 A | 3/1994 | Kumazaki et al. | |
| 5,387,014 A | 2/1995 | Chevallier | |
| 5,398,729 A | 3/1995 | Spurgat | |
| 5,423,581 A | 6/1995 | Salyers | |
| 5,430,603 A | 7/1995 | Albino et al. | |
| 5,556,138 A | 9/1996 | Nakajima et al. | |
| 5,772,160 A | 6/1998 | Gordon | |
| 5,860,681 A | 1/1999 | Slais | |
| 5,961,157 A | 10/1999 | Baron et al. | |
| 5,984,376 A | 11/1999 | Lampe | |
| 5,992,898 A | 11/1999 | Saylor | |
| 6,233,992 B1 | 5/2001 | Geisman | |
| 6,328,073 B1 | 12/2001 | Slais | |
| 6,378,908 B1 | 4/2002 | Walker et al. | |
| 6,488,314 B1 | 12/2002 | Hutter | |
| 6,634,679 B1 | 10/2003 | Stieler | |
| 6,637,779 B2 | 10/2003 | Andre | |
| 6,682,100 B2 | 1/2004 | Wood et al. | |
| 6,776,421 B2 | 8/2004 | Florence et al. | |
| 6,908,117 B1 | 6/2005 | Pickett, Jr. et al. | |
| 7,032,500 B1 | 4/2006 | Sinclair et al. | |
| 7,062,834 B2 | 6/2006 | Patterson et al. | |
| 7,155,906 B2 | 1/2007 | Yokota et al. | |

*Primary Examiner*—Jermie E Cozart
(74) *Attorney, Agent, or Firm*—Dinsmore & Shohl LLP

(57) ABSTRACT

A method for endforming a tubular member for use assembly for a hydraulic system comprises (1) a connector member having an inner surface exhibiting a stepped configuration and a fixing member at the distal end thereof, and (2) an endform tubular member having an outer surface corresponding to the inner surface of the connector member, wherein the endform tubular member mates with inner surface of the connector member to provide an endform tubular assembly having an improved design for conveying fluids in a hydraulic system. The endform tubular assembly has inherent features therein that are measured to provide quantified values for assessing the robustness of the assembly and predict the performance of such assembly in high pressure applications for prolonged periods of time.

33 Claims, 4 Drawing Sheets

PROCESS OF ENDFORMING A TUBULAR ASSEMBLY

BACKGROUND OF THE INVENTION

1. Field of the Invention

The present invention relates to fluid flow assemblies and, in particular, to tubular assemblies for pressurized fluid flow. More particularly, the present invention relates to a process of endforming a fluid flow assembly possessing reliable features for assessing the robustness of the fluid flow assemblies in an automotive power steering system.

2. Discussion of Related Art

Fluid flow assemblies for power steering systems include a steering gear housing, a steering gear disposed in the steering gear housing, a pump for moving the power steering fluid under pressure, a supply line for transporting pressurized fluid from the pump to the steering gear, and a return line for transporting the fluid from the steering gear back to the pump. Typically, such assemblies include one or more brackets or support members that are used to mount the power steering components within an automotive vehicle. The end of each of the supply line and the return line may be individually connection to an inlet port and an outlet port in the housing, respectively, by employing means such as a "tube-o" connector wherein a threaded nut is used behind each of the tube-o connectors to secure each of the tubes to a corresponding threaded port in the housing. Tube-o connectors are considered to be inefficient since they require a separate installation step for each connection.

Other assemblies have been developed wherein a bracket is used to simultaneously couple a fluid supply line and a fluid return line in a fluid flow assembly using a single fastener wherein the complete assembly is connected to a housing with the torque of the single fastener. While the single torque bracket connection is effective for reducing the number of operational steps necessary in the assembling process, such connections are unsatisfactory because they generally require that at least one of the tubular members be brazed into a machined connector. Brazed connections are not reliable, particularly in applications where the brazed part is subjected to the harsh environmental conditions present in the engine compartment of an automotive vehicle. For example, the brazed part may be subjected to extremely cold temperatures in winter during periods when the automotive vehicle is not operating and then suddenly required to withstand high temperatures during operation of the automotive vehicle. Constant vibrational episodes and occasional debris entering the compartment also severely reduce the life expectancy of such brazed connections. Another disadvantage of prior brazed clamp plate connections is that the clamp plate does not sit flush against the housing, such that when torque is applied to the fastener, the bracket may distort leading to premature o-ring failure.

U.S. Pat. No. 7,032,500 describes a fluid flow assembly for a power steering system wherein both a pressure line assembly and a fluid return line are simultaneously connected to a steering gear using a bracket requiring a single fastener. The bracket includes an aperture through which the high pressure line extends and a notch configured to receive a return line assembly. The return line assembly includes a connector member to which the line is brazed or welded. The connector member also includes a pair of circumferential flanges, which allows the bracket to swing over the connector member such that the hose assembly is secured to the bracket member between the pair of circumferential flanges. In such arrangement, the connector is compressed into the port to create a seal. The high pressure tube is deformed to create a first bead and, after the high pressure tube is inserted through the bracket, a second bead is formed to secure the tube to the bracket. Such arrangements are not without disadvantages. For example, such fluid flow assembly may employ undesirable brazing or welding for securing at least one of the supply hose and the return hose to the connector. Also two separate steps are needed to form the two beads on either side of the bracket for securing the non-brazed high pressure line to the bracket. Such arrangement is not only time consuming and labor intensive, but the tube may be susceptible to undesirable axial rotation as well as up/down and side to side movement in the bracket. Such undesirable movement severely limits the life expectancy of the assembly. Furthermore, each of the return and pressure hoses require the additional step of forming a groove in the ends of the hoses for receiving an o-ring. Consequentially, current tubular assembly design does not provide an economical fluid flow bundle having assured long term dependability and structural integrity, nor does it provide inherent features, which allow the reliable assessment of the robustness of such fluid flow assemblies.

Therefore, it would be desirable to provide a method of endforming a tubular assembly that would have a robust design exhibiting improved sealability, long term dependability and reduced manufacturing costs, and which would have inherent computable quality control features for assessing the robustness of the endform tubular assembly and for predicting the performance of the endform tubular assembly in high pressure applications for prolonged periods of time.

3. Related Applications

The contents of copending applications U.S. Ser. No. 11/769,305, and U.S. Ser. No. 11/769,325, both relating to the same subject matter as the present application, and both of which are filed simultaneously herewith, are incorporated herein by reference thereto.

SUMMARY OF THE INVENTION

It is an object of the invention to provide a method for endforming a tubular assembly having improved sealing characteristics.

It is another object of the invention to provide a fluid flow assembly utilizing the endform tubular assembly having improved sealing characteristics.

It is yet another object of the invention to provide a method for endforming a tubular assembly having measurable structural elements for determining the robustness of the endform tubular assembly.

It is yet another object of the invention to provide a method for endforming a tubular assembly such that the endform tubular assembly has measurable structural elements for predicting the performance of the endform tubular assembly in high pressure applications for prolonged periods of time.

The present invention provides a method for endforming a tubular assembly that is particularly useful in a fluid, flow assembly for conveying fluid in a hydraulic system such as a power steering system. Typically, a fluid flow bundle includes first and second tubular assemblies each disposed between a pump and a power steering housing in the hydraulic system. The first tubular assembly provides pressurized fluid from the pump to the power steering housing and the second tubular assembly returns fluid from the power steering housing to the pump. The fluid flow assembly further includes a clamp plate configured for simultaneously connecting the first endform assembly and the second tubular assembly to the housing using a single torque on a fastener.

The endform tubular assembly of the present invention includes a connector member and an endform tubular member wherein the outer surface of the endform tubular member corresponds to the inner surface of the connector member so that the endform tubular member mates with the connector member and is securely integrated therewith. Typically, the connector member is a machined connector member having an outer surface and an inner tubular surface extending the longitudinal length of the connector member. More particularly, the connector includes a first shoulder portion defining a distal end of the connector member, the first shoulder portion including at least one fixing member integral with the distal end of the first shoulder portion; (ii) a second shoulder portion defining a proximal end of the connector member; and (iii) a brim or flange portion formed on the connector member intermediate the first and second shoulder portions such that the brim or flange extends perpendicularly with respect to the outer surfaces of the first and second shoulders.

The endform tubular member has an inner surface and outer surface, the outer surface corresponding to the inner surface of the connector member securely locking the endform tubular member to the connector member. The endform tubular member includes a bead uniformly formed circumferentially around the outer surface of the endform tubular member adjacent the distal end of the first shoulder portion of the connector member. The bead fixedly engages the fixing member(s) in the first shoulder portion to prevent axial rotation of the endform tubular member relative to the first shoulder portion, and to further prevent longitudinal movement of the endform tubular member relative to the first shoulder portion. The bead also provides a first unique and important feature in the endform tubular assembly of the invention. A precise measurement of the diameter of the bead provides a quantifiable value for assessing the robustness of the endform tubular assembly and for predicting the performance of the endform tubular assembly in high pressure applications over prolonged periods of time.

The endform tubular assembly of the present invention is a robust design that is designed to eliminate failure modes associated with brazing and/or welding that can cause reduced operating life of the assembly; prevent structural deformation of the clamp plate during use; and prevent premature o-ring failure commonly found in conventional fluid-conveying tubular assemblies.

A particular advantage of the endform tubular assembly design of the present invention is that the assembly includes at least two inherent features that can be measured independently and the quantifiable values obtained can be used individually or in combination to assess the robustness of the endform tubular assembly, and predict the performance probability of the endform tubular assembly in high pressure applications.

DETAILED DESCRIPTION OF THE INVENTION

Figure 1:
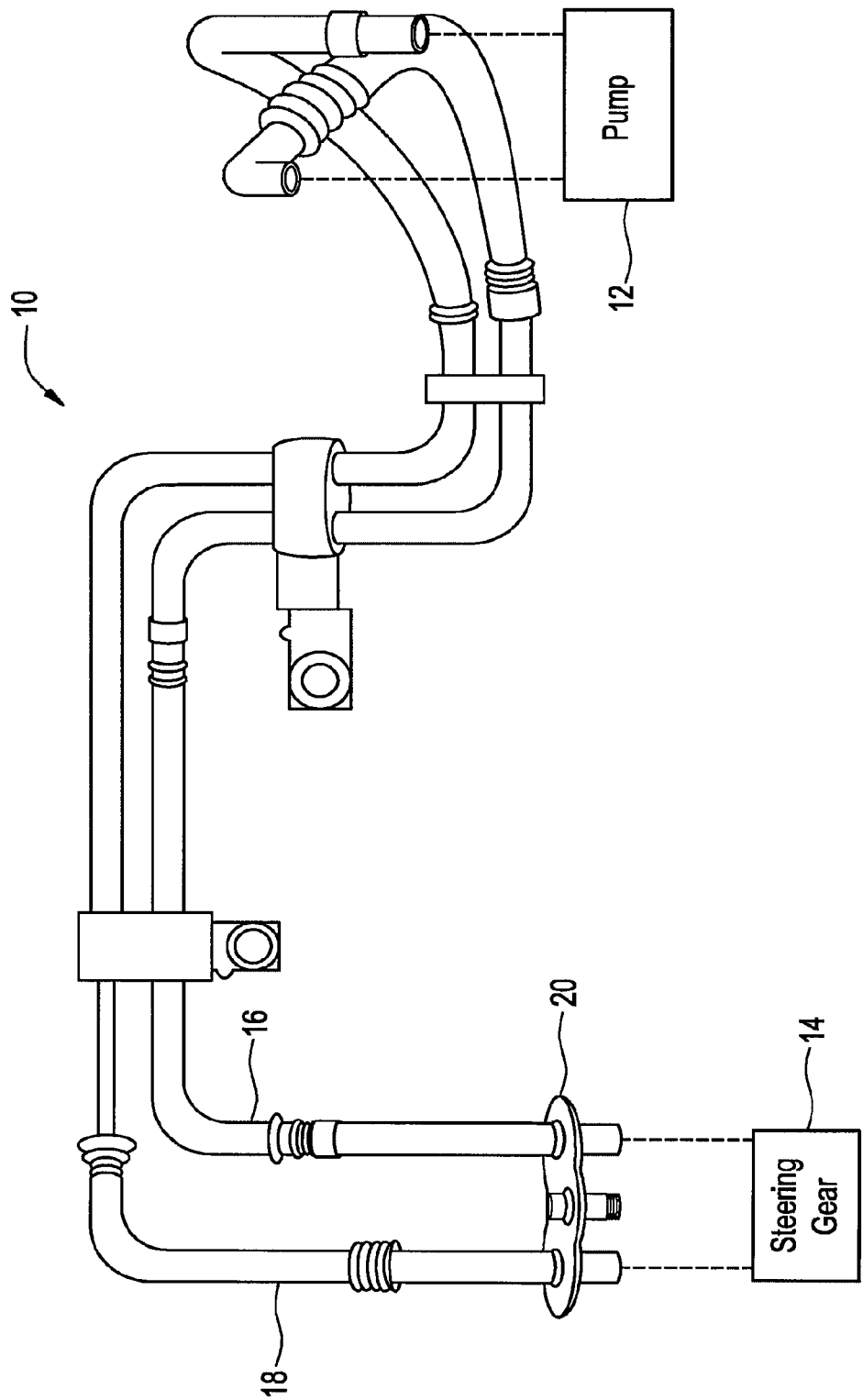
FIG. 1 is a diagrammatic view of a conventional power steering assembly as described in the prior art.

In a first embodiment of the invention, there is described a method for endforming a tubular member. The endform tubular member exhibits a highly robust design exhibiting improved sealability, long term dependability and reduced manufacturing costs. In a second embodiment of the invention, there is described an endform tubular assembly having improved properties for use in a fluid flow assembly for conveying fluid in a hydraulic system such as a power steering system, power brake system, air conditioner system, oil cooler system, various heating systems, and the like. In a third embodiment of the invention, a method is described for the non-destructive evaluation of the endform tubular assemblies to determine the robustness of the assemblies during the endforming process. The evaluation of the assemblies is quickly and reliably performed by making a simple measurement on at least one inherent feature of the assembly. This third embodiment will be discussed more fully below.

In accordance with the first embodiment of the invention, a method for endforming a tubular member to provide an endform tubular assembly for a hydraulic system is as follows:

(a) providing a tubular member having a substantially uniform diameter and wall thickness, said tubular member capable of being endformed;

(b) reducing one end of the tubular member in a first station of a forming machine to provide a tubular member having a first tubular portion and a reduced second tubular portion;

(c) providing a connector member having an outer surface and an inner surface wherein the inner surface extends longitudinally through the connector member which includes:

(1) a first shoulder segment defining a distal end of the connector member, wherein the first shoulder segment including at least one fixing member integral with the first shoulder segment;

(2) a second shoulder segment defining a proximal end of the connector member; and (3) a brim segment intermediate the first and second shoulder segments extending perpendicularly from the outer surface of the connector member; wherein said first shoulder segment comprises a first inner wall portion having a first inner surface exhibiting a first diameter; the second shoulder segment comprising a second inner wall portion having a second inner surface exhibiting a second diameter and a third inner wall portion having a third inner surface exhibiting a third diameter, wherein the second diameter is smaller than said first diameter, and the third diameter is larger than said second diameter, but may be smaller than the first diameter;

(d) inserting the tubular member into the connector member such that the first tubular portion of the tubular member and the second tubular portion of the tubular member mate with the first inner wall portion of the connector member and the second wall portion of the connector member, respectively;

(e) forming a uniform bead around the outer surface of the first tubular portion of the tubular member in a second station of the forming machine, wherein the uniform bead is in the first shoulder segment of the connector member adjacent the brim segment to prevent longitudinal movement of the tubular member in the connector member;

(f) expanding a proximal end of the second inner wall portion of the second tubular portion into the third inner wall portion of the second shoulder segment, in a third station of the forming machine to provide an endform tubular assembly wherein the tubular member has a first inner wall portion exhibiting a first diameter, a second inner wall portion exhibiting a second diameter and a third inner wall portion exhibiting a third diameter, the third inner wall portion defining a gauge diameter depth in the proximal end of said endform tubular assembly.

Preferably, the endform tubular assembly is employed as at least one of a first tubular assembly and a second tubular assembly in a fluid flow assembly for a power steering system, wherein the fluid flow assembly comprises a housing having a steering gear disposed therein, the housing including a first port extending from an outer surface of the housing to an inner surface of the housing and a second port extending from the outer surface of the housing to the inner surface of the housing; a pump; a first endform tubular assembly having a first end connected to the first port in the housing and a second end attached to the pump, wherein the first endform tubular assembly conveys fluid under pressure from said pump to the housing through the first port; a second tubular assembly having a first end connected to the second port in the housing and a second end connected to the pump, wherein the second tubular assembly conveys fluid from the housing to the pump; and a clamp plate having a first aperture through which the first tubular assembly extends, a U-shaped second aperture through which the second tubular assembly extends, and a third aperture configured for connecting the clamp plate to the hydraulic housing, wherein the first port for receiving the first tubular assembly and the second port for receiving the second tubular assembly are configured, respectively to receive the first tubular assembly and the second tubular assembly such that the clamp plate fits flush against the housing.

In accordance with a second embodiment of the invention, a method for assembling an endform tubular assembly for use in a fluid flow assembly is described as follows:

(a) providing a tubular member having a substantially uniform diameter and wall thickness, wherein the tubular member is capable of being endformed;

(b) reducing one end of the tubular member in a first station of a forming machine to provide a tubular member having a first tubular portion and a reduced second tubular portion, the first tubular portion having a first diameter, and the reduced second tubular portion having a second diameter;

(c) providing a connector member having an outer surface and an inner surface wherein the inner surface extends longitudinally through the connector member, the connector member comprising:

(1) a first shoulder segment defining a distal end of the connector member, the first shoulder portion including at least one fixing member integral with the first shoulder portion;

(2) a second shoulder segment defining a proximal end of the connector member; and (3) a brim segment intermediate said first shoulder segment and the second shoulder segment, the brim segment extending perpendicularly from the outer surface of the connector member; wherein the first shoulder segment comprises a first inner wall portion having a first inner surface exhibiting a first diameter; the second shoulder segment comprising a second inner wall portion having a second inner surface exhibiting a second diameter and a third inner wall portion having a third inner surface exhibiting a third diameter, wherein the second diameter is smaller than the first diameter, and the third diameter is larger than said second diameter, but may be smaller than the first diameter;

(d) inserting the tubular member into the connector member such that the first tubular portion of the tubular member and the second tubular portion of the tubular member mate with the first inner wall portion of the connector member and the second wall portion of the connector member, respectively;

(e) forming a uniform bead around the outer surface of the first tubular portion of the tubular member in a second station of the forming machine, wherein the uniform bead is in the first shoulder segment of the connector member adjacent the brim segment to prevent longitudinal movement of the tubular member in the connector member;

(f) expanding a proximal end of the second inner wall portion of the second tubular portion into the third inner wall portion of the second shoulder segment, in a third station of said forming machine to provide a tubular member having a first inner wall portion, a second inner wall portion and a third inner wall portion, the reduced second outer diameter having a second inner diameter and a third inner diameter, the third inner wall portion defining a gauge diameter depth in the proximal end of the endform tubular member;

(g) providing a clamp plate having a substantially flat first surface and a substantially flat second surface wherein the second surface corresponds to the first surface; a first aperture configured to accept the distal end of the connector portion; a U-shaped second aperture configured to accept a distal end of a second tubular assembly and a third aperture for accepting a fastener for connecting the fluid flow assembly to the power steering housing;

(h) installing the first tubular assembly onto the clamp plate such that the aperture in the clamp plate receives the first shoulder segment of the connector member to provide a press fit coupling, wherein the clamp plate abuts the brim segment of the connector member;

(i) installing the second tubular assembly onto the clamp plate such that the U-shaped second aperture receives the second tubular assembly securing the second tubular assembly thereto;

(j) installing the clamp plate assembly to the power steering housing employing a single fastener wherein the first endform tubular assembly engages a first port in the hydraulic housing for receiving pressurized fluid from the pump, and the second tubular assembly engages a second port in the power steering housing for returning the fluid from the housing to the pump; wherein the clamp plate having the first endform tubular assembly and the second tubular assembly secured thereto provides a clamp plate assembly;

(k) installing a sealing means on the outer surface of the proximal end of the endform tubular member adjacent the proximal end of the second shoulder segment; and (l) flaring the proximal end of the endform tubular member to retain the o-ring thereon. The fluid flow system comprises a housing for a steering gear, the housing including a first port extending from an outer surface of the housing to an inner surface of the housing and a second port extending from the outer surface of the housing to an inner surface of the housing; a pump; a first tubular assembly having a first end connected to the first port in the housing and a second end attached to the pump, wherein the first tubular assembly conveys fluid under pressure from the pump to the housing; a second tubular assembly having a first end connected to the second port in the housing and a second end connected to the pump wherein the second tubular assembly conveys fluid from the housing to the pump; and a clamp plate having a first aperture through which the first tubular assembly extends, a U-shaped second aperture having an open end through which the second tubular assembly extends, and a third aperture intermediate the first aperture and said second U-shaped aperture, the third aperture configured for connecting the clamp plate to the hydraulic housing, wherein the first port for receiving the first tubular assembly and the second port for receiving the second tubular assembly are configured to receive the first tubular assembly and the second tubular assembly such that the clamp plate fits flush against the housing.

Figure 2:
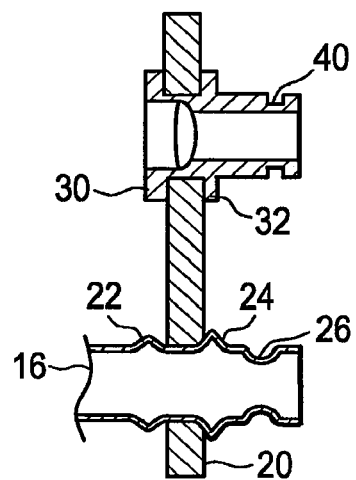
FIG. 2 is a sectional view of a portion of a tubular assembly in accordance with of FIG. 1.

Referring now to the drawings, FIGS. 1 and 2 are provided solely to show the state of the prior art as it relates to fluid flow assemblies for power steering systems. FIG. 1 shows a prior art power steering assembly 10, which includes a pump 12, a steering gear 14, a first hose assembly 16 for conveying pressurized fluid from the pump to the steering gear, and a second hose assembly 18 for returning fluid to the pump. FIG. 2 shows a sectional view of a portion of the prior art assembly of FIG. 1 wherein the first hose assembly 16 employs two spaced beads 22, 24 to secure the hose to a bracket 20. The second hose assembly 18 includes a connector 28 having a pair of spaced circumferential flanges for receiving the bracket between the circumferential flanges thereby securing the hose to the bracket.

Figure 3:
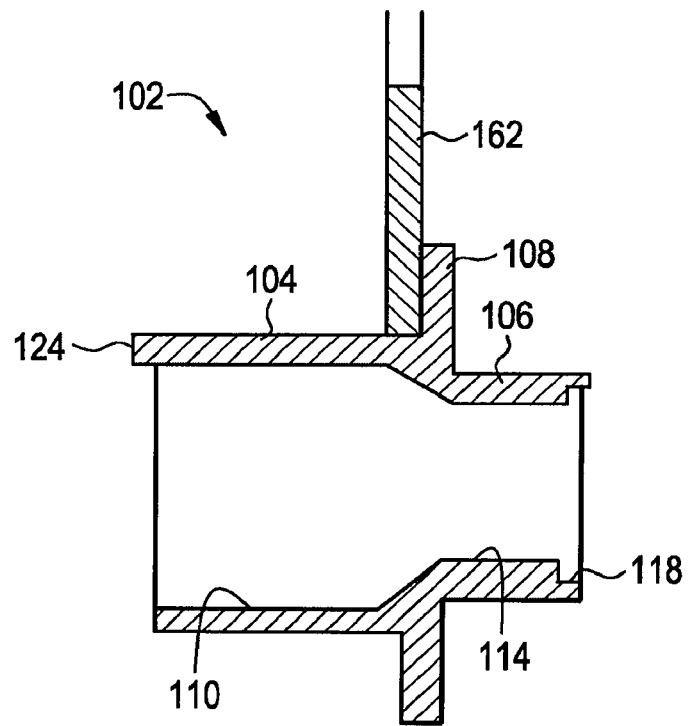
FIG. 3 is a longitudinal cross-sectional view of a connector member in accordance with the present invention.
Figure 4:
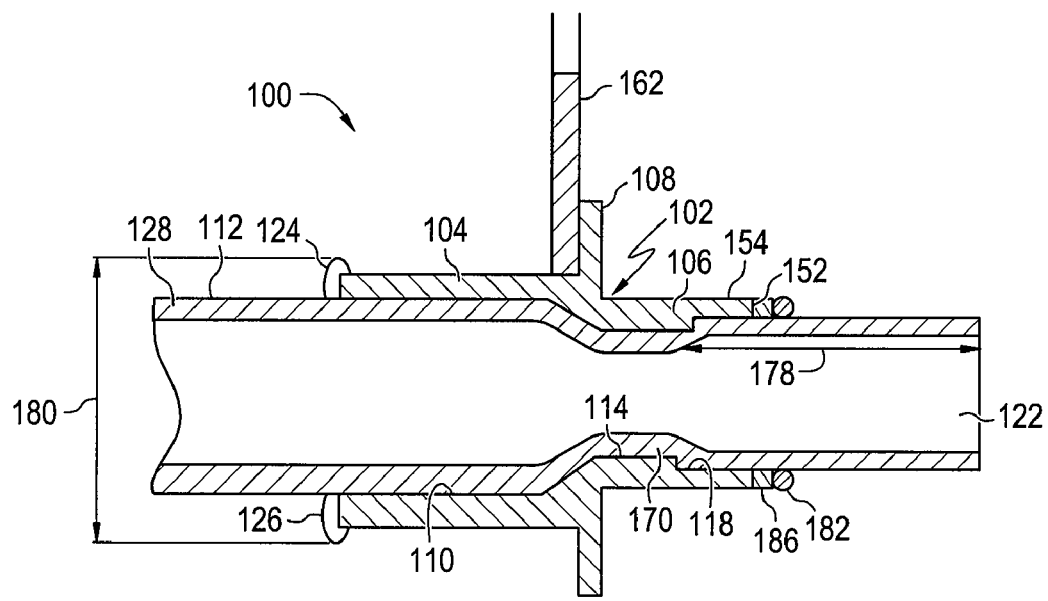
FIG. 4 is a cross-sectional view of an endform tubular assembly in accordance with the invention.
Figure 5:
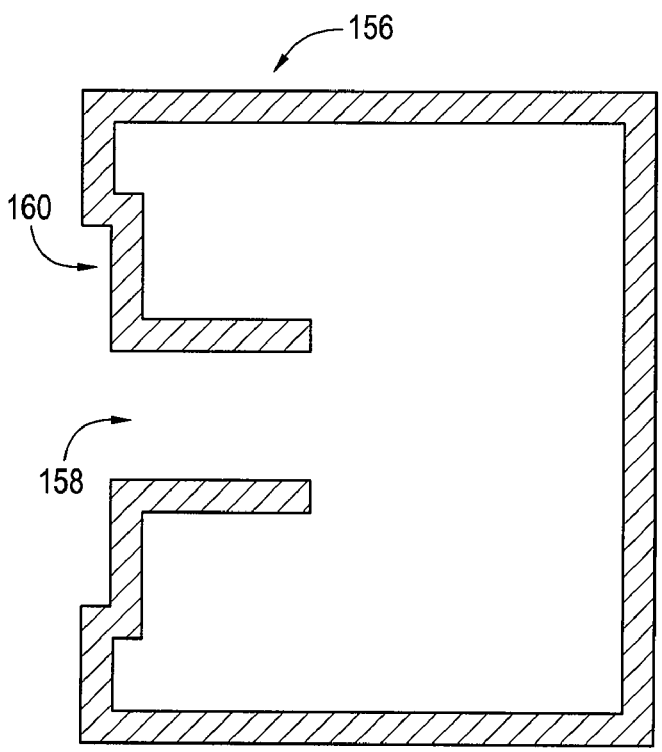
FIG. 5 is a diagrammatic view of a hydraulic housing illustrating a port into which the endform tubular assembly of FIG. 4 is inserted.

FIGS. 3 through 5 illustrate an endform tubular assembly 100 including a clamp plate 162 in accordance with the present invention. As illustrated in FIG. 3 a connector member 102 includes a first shoulder portion 104 including at least one fixing member 124 integral therewith; a second shoulder portion 106 defining a proximal end of the connector member 102, and a brim portion 108 intermediate the first shoulder portion 104 and the second shoulder portion 106, the brim portion 108 extending perpendicularly relative to the first and second shoulder portions, wherein the connector member 102 has an inner wall surface extending longitudinally through the connector member 102, the inner wall further comprising a first inner wall portion 110 having a first diameter, a second inner wall portion 114 having a second diameter, and a third inner wall portion 118 having a third diameter, wherein the second diameter is smaller than both the first diameter and the third diameter, and the third diameter is larger than the second diameter, but may be either larger or smaller than the first diameter In a preferred aspect of the invention, the frusto-conical angle defining the reduction of the inner surface of the first shoulder portion relative to the inner surface of the second shoulder portion is greater than 0° and less than about 90°. Preferably, the angle is about 30° to about 60°. Most preferably the angle will be about 40° to about 50°.

As illustrated in FIG. 4, an endform tubular assembly generally designated 100 includes a connector member 102 having a first shoulder portion 104 defining a distal end of the connector member 102. The first shoulder portion 104 further includes at least one fixing member 124 integral with the distal end of the first shoulder portion 104. The fixing member may be of any configuration suitable to engage the bead and prevent axial movement of the tubular member in the connector member. Typically, the fixing member is a tabular member extending from the distal end of the first shoulder portion of the connector member. The number of fixing members employed is not critical and may range from a single fixing member to several fixing members. Furthermore, when more than one fixing member is employed, such fixing members may have the same or different configuration. The fixing member may be in the form of one or more tabs, projections, notches, indentations, grooves, ridges, etc. The bead 126 is not only an essential feature of the invention for preventing both axial rotation and longitudinal movement of the tubular assembly relative to the connector member, but the proper formation of the bead indicates that a correct length of tubing was employed in the step of forming the bead in the tubular assembly. As further illustrated in FIG. 4, a second shoulder portion 106 defines a proximal end of the connector member 102. A brim portion 108 extends perpendicularly relative to the first and second shoulder portions 102, 103 and intermediate the two shoulder portions 102, 103.

The endform tubular member 128 includes an intermediate portion 170 that has an outer surface corresponding to the inner wall surface of the connector member 102 such that the outer surface of the endform tubular member fixedly engages the inner wall surface of the connector member 102. A distal portion of the endform tubular member 128 has an inner surface and an outer surface, the distal portion extending axially from the intermediate portion. The distal portion has a bead 126 formed therein adjacent the first shoulder portion 104 of the connector member 102. The bead 126 prevents the longitudinal movement of the endform tubular member 128 in the connector member 102 and also fixedly engages the fixing member(s) 124 in the first shoulder portion 104 to prevent axial rotation of the endform tubular member 128 relative to the connector member 102. The endform tubular member 128 further includes a proximal portion having an inner surface and an outer surface. The proximal portion of the second shoulder portion 106 having an inner surface and an outer surface. The second shoulder portion 106 includes an annular ridge 118 formed in the proximal end thereof. The endform tubular member 128 is extending from the proximal end of the connector member 102 is expanded into the notch simultaneously with the formation of the bead in the endform tubular assembly. The expansion of the tubular member 128 into the annular ridge in the proximal end of the second shoulder portion 106 creates a cylindrical area therein, the longitudinal length 178 of which defines a gauge diameter depth 122. The gauge diameter depth 122 not only provides additional means for preventing movement of the endform tubular member 128 relative to the connector member 102, but the longitudinal length of the gauge diameter depth 122 is a direct correlation of material flow into the ridge 118 formed in the proximal end of the first shoulder portion 104.

FIG. 5 schematically illustrates a hydraulic housing 156 having a port 158 for accepting the endform tubular assembly 100. Typically, the port 158 may exhibit a slight annular taper to help squeeze the o-ring during insertion to provide a secure seal. The port 158 includes a recessed portion 160 sized to accept the brim 108 of the connector member. The recessed portion 160 allows the flat surface of the clamp plate 162 to fit flush against the housing. The flush fit of the clamp plate against the housing prevents the clamp plate from being deformed in instances where excessive torque may be unwittingly placed on the single fitting. Such deformation of the clamp plate would not only destroy the clamp plate, but almost certainly would cause irreparable damage to the tubular assemblies and perhaps even to the hydraulic housing port and/or the housing itself.

Figure 6:
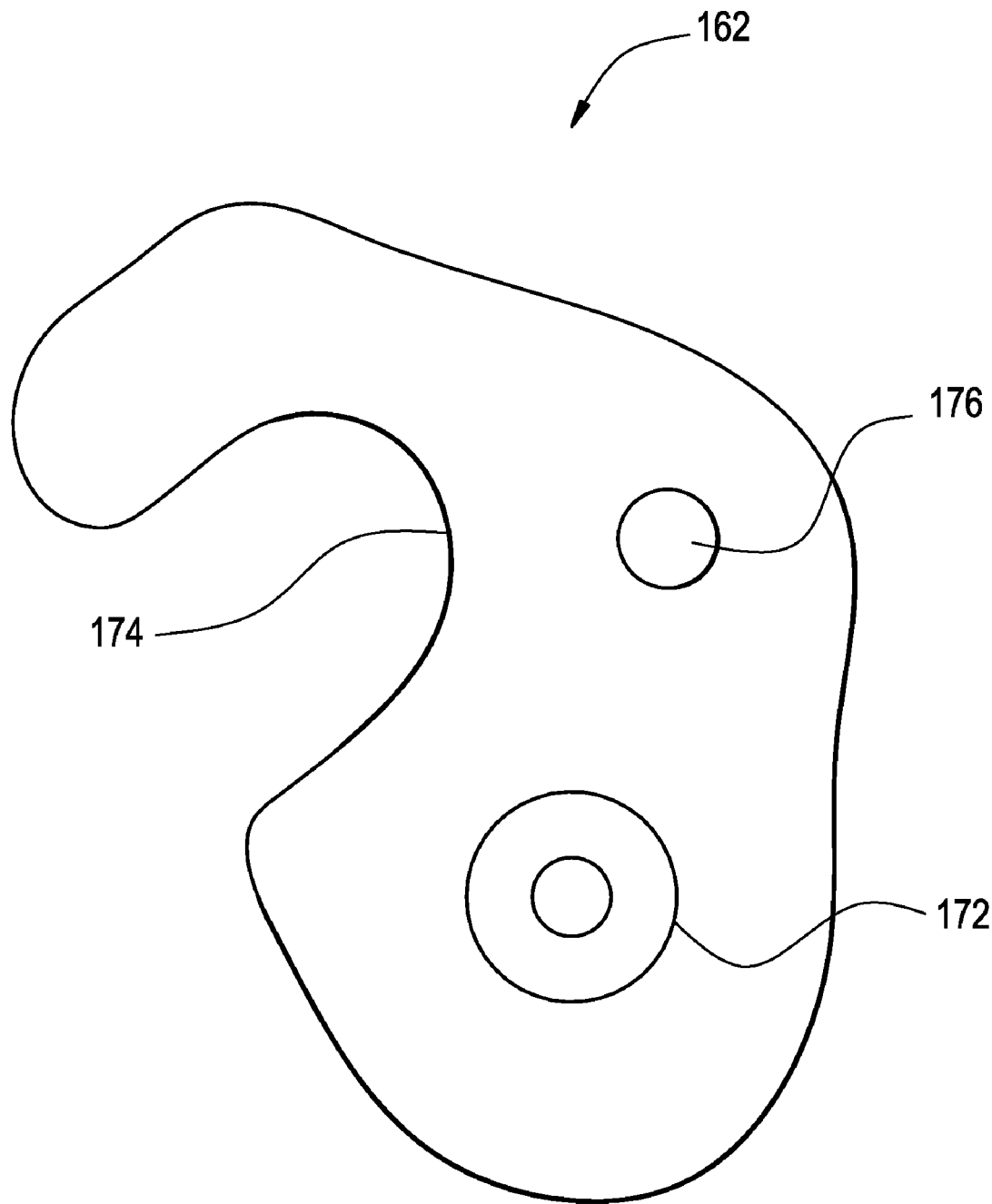
FIG. 6 is a plane view of a clamp plate including an endform tubular assembly press fit together in accordance with the invention.

FIG. 6 is an elevated plan view of the clamp plate 162. The clamp plate 162 includes a first aperture 172 sized to accept the first shoulder portion of the connector member wherein the connector member 105 and the clamp plate 162 are secured together, preferably by press fitting the clamp plate 162 onto the first shoulder portion of the connector member. A U-shaped notch 174 on the other end of the clamp plate from the first aperture is configured to accept and secure a return tubular member in the clamp plate 162. A second aperture 176 intermediate the first aperture 172 and the U-shaped notch 174, is sized to receive a fastener such as a bolt, screw, pin, or equivalent for mounting the clamp plate 162 including both of the fluid flow assemblies to the hydraulic housing in one mounting step by applying an appropriate torque to a single fastener.

In the prior art, an o-ring is employed within an annular groove in the proximal end of the tube or in the proximal end of a connector to seal the structure and prevent leaks. The formation of such groove requires additional labor and expense. The sealing member of the present invention is simply placed onto the end of the endform tubular member 128 that extends longitudinally through a connector member 102. According to the present invention, the sealing member simply rests against the end of the connector without requiring a separate groove. The proximal end of the tubular member is slightly flared to prevent the sealing member from falling off. The sealing member of the present invention is typically an o-ring 182 and preferably an o-ring 182 formed from a polymeric material such as nitrile-butadiene rubber, hydrogenated nitrile-butadiene rubber, ethylene-acrylate elastomer, ethylene-vinyl acetate copolymer, acrylic rubber, ethylene methacrylate elastomer, tetrafluoroethylene, and blends thereof. A retaining ring 186 is preferably employed between the metal end of the second shoulder portion 104 and the o-ring 182 to help maintain the integrity of the o-ring 182. The retaining ring 186 is formed from a polymeric material such as Teflon (tetrafluoroethylene), metal or metal alloy. If the retaining ring 186 is formed from a metal, it is preferred that the metal be different and less rigid than the metal used to form the connector member 102. Preferably, the retaining ring 186 is a Teflon retaining ring. In placing the retaining ring 186 against the metal surface of the second shoulder portion 104 of the connector member 102, it is important that the perpendicular surface of the connector member 102 be as close to 90.degree. as possible to prevent any undo skewed pressure which may lead to premature failure of the retaining ring 186 and/or o-ring 182.

The connector member and the endform tubular member are typically formed from a metal having sufficient characteristics to withstand the harsh environment of an automotive vehicle motor compartment and the pressures involved in conveying high pressure fluid. Preferably, both the connector member and the endform tubular assembly are formed from steel or a material having steel as a major ingredient.

As discussed briefly above, certain inherent features present in the endform tubular assembly provides a quantified numerical value which, when compared to a predetermined range of quantified numerical values, is a valuable method for assessing the robustness of the resultant endform tubular assembly and for predicting the performance of the endform tubular assembly in high pressure applications over prolonged periods of time.

It is to be understood that the tubular member used in forming the endform tubular assembly of the invention can be of any size necessary to perform the particular function desired providing, of course, that the connector member is sized accordingly. Preferably the tubular member has an outer diameter of about 5/16 inch to about ½ inch. A tubular member having an outer diameter of about ⅜ inch has been found to be desirable.

In a first significant aspect of the invention, it has been found that an accurate measurement of the diameter 180 of bead 126 formed in the endform tubular member 128 at the distal end of the first shoulder portion 104 is a direct indicator as to the reliability of the endform tubular assembly 100 in high pressure applications. When the diameter 180 of the bead 126 is within a specifically determined range of values, the endform tubular assembly 100 can be expected to perform reliably over a prolonged period of time in high pressure applications. When the measured diameter 180 of the bead 126 is at or near the extreme ends of the predetermined range of values, the robustness of the endform tubular assembly predictably becomes somewhat less reliable. Generally, if the diameter 180 falls outside the predetermined range, the endform tubular assembly is discarded. The diameter of the bead can be measured be any means available which will provide an accurate measurement of the bead. It has been found that calipers and an optical comparative, both of which are commercially available, easily and accurately provide the required measurements.

In a second significant aspect of the invention, it has been found that an accurate measurement of the length 178 of the inner surface defined as the gage diameter depth is a direct indicator as to the reliability of the endform tubular assembly 100 in high pressure applications. When the length 178 of the gage diameter depth 122 is within a specifically determined range of values, the endform tubular assembly 100 can be expected to perform reliably over a prolonged period of time in high pressure applications. Much like the measurement of the bead diameter discussed above, when the length of the gage diameter depth 122 falls within a specifically determined range of values, the endform tubular assembly can be expected to perform reliably over a prolonged period of time in high pressure applications. As the measured length 178 of the gage diameter depth 122 is at or near the extreme ends of the predetermined range of values, the robustness of the endform tubular assembly predictably becomes somewhat less reliable. Generally, if the length 178 falls outside the predetermined range, the endform tubular assembly 100 is discarded. The accurate measurement of the length of the gage diameter depth compared to a predetermined length is a reliable indication of the robustness of the endform tubular assembly. The longitudinal length (or depth) of the gauge diameter depth can be measured be any means available which will provide an accurate measurement of the longitudinal length of the gauge diameter depth. It has been found that a simple device such as a pin inserted into the inner diameter of the tube at the gauge diameter depth will easily and accurately provide the required measurements. If the pin reaches a predetermined depth, the tube is satisfactory.

Prior to the present invention, there were no non-destructive methods for determining the reliability of such tubular assembly parts. More importantly, there is no current method for determining whether a particular tubular assembly passes or fails predetermined specifications Accordingly, manufacturers randomly select one or more of the tubular assemblies, cut them open to visually determine the robustness of the selected tubular assemblies, and then adjusts the manufacturing process accordingly. Obviously, the inspected tubular assemblies are destroyed and have to be discarded. Such determinations are inefficient, time consuming, and unreliable at best. The diameter of said bead compared to a predetermined diameter is a reliable indication of the robustness of said endform tubular assembly, during the manufacture of such tubular assemblies.

What is claimed is:

1. A method for endforming a tubular member to provide an endform tubular assembly for a hydraulic system, said method comprising:

(a) providing a tubular member having a substantially uniform diameter and wall thickness, said tubular member capable of being endformed;

(b) reducing one end of said tubular member in a first station of a forming machine to provide a tubular member having a first tubular portion and a reduced second tubular portion;

(c) providing a connector member having an outer surface and an inner surface wherein said inner surface extends longitudinally through said connector member, said connector member comprising:
   (1) a first shoulder segment defining a distal end of said connector member, said first shoulder segment including at least one fixing member integral with said first shoulder segment;
   (2) a second shoulder segment defining a proximal end of said connector member; and
   (3) a brim segment intermediate said first shoulder segment and said second shoulder segment, said brim segment extending perpendicularly from said outer surface of said connector member; wherein said first shoulder segment comprises a first inner wall portion having a first inner surface exhibiting a first diameter; said second shoulder segment comprising a second inner wall portion having a second inner surface exhibiting a second diameter and a third inner wall portion having a third inner surface exhibiting a third diameter, wherein said second diameter is smaller than said first diameter, and said third diameter is larger than said second diameter;

(d) inserting said tubular member into said connector member such that said first tubular portion of said tubular member and said second tubular portion of said tubular member mate with said first inner wall portion of said connector member and said second wall portion of said connector member, respectively;

(e) forming a uniform bead around an outer surface of said first tubular portion of said tubular member in a second station of said forming machine, wherein said uniform bead is in said first shoulder segment of said connector member adjacent said brim segment to prevent longitudinal movement of said tubular member in said connector member; and (f) expanding a proximal end of a second inner wall portion of said second tubular portion into said third inner wall portion of said second shoulder segment, in a third station of said forming machine to provide an endform tubular assembly wherein said tubular member has a first inner wall portion exhibiting a first diameter, said second inner wall portion exhibiting a second diameter and a third inner wall portion exhibiting a third diameter, said third inner wall portion defining a gauge diameter depth in a proximal end of said endform tubular assembly.

2. The method of claim 1 further comprising installing a sealing member on an outer surface of said proximal end of said endform tubular member, said sealing member configured to mate with said hydraulic housing to seal said tubular member to said hydraulic housing.

3. The method of claim 2 wherein said sealing member includes an o-ring disposed on said outer surface of said proximal end of said endform tubular assembly.

4. The method of claim 3 wherein said o-ring is formed from a polymeric material selected from the group consisting of nitrile-butadiene rubber, hydrogenated nitrile-butadiene rubber, ethylene-acrylate elastomer, ethylene-vinyl acetate copolymer, acrylic rubber, ethylene methacrylate elastomer, tetrafluoroethylene, and blends thereof.

5. The method of claim 3 wherein said proximal end of said endform tubular assembly is flared to retain said o-ring thereon.

6. The method of claim 3 further including a retaining ring between said o-ring and said second shoulder segment of said connector member, said retaining ring having sufficient resilience to prevent deformation of said o-ring.

7. The method of claim 6 wherein said retaining ring is formed from a polymeric material, a metal or a metal alloy.

8. The method of claim 7 wherein said retaining ring is a polytetrafluoroethylene ring.

9. The method of claim 1 wherein said second inner wall portion having a reduced diameter compared to said diameter of said first inner wall portion exhibits an inner concentric reduction angle of up to about 90°.

10. The method of claim 9 wherein said second inner wall portion having a reduced diameter compared to said diameter of said first inner wall portion exhibits an inner concentric reduction angle of about 15° to about 60°.

11. The method of claim 1 wherein said endform tubular assembly is employed as at least one of a first tubular assembly and a second tubular assembly in a fluid flow assembly for a power steering system, wherein said fluid flow assembly comprises a housing having a steering gear disposed therein, said housing including a first port extending from an outer surface of said housing to an inner surface of said housing and a second port extending from said outer surface of said housing to said inner surface of said housing; a pump; a first endform tubular assembly having a first end connected to said first port in said housing and a second end attached to said pump, wherein said first endform tubular assembly conveys fluid under pressure from said pump to said housing through said first port; a second tubular assembly having a first end connected to said second port in said housing and a second end connected to said pump, wherein said second tubular assembly conveys fluid from said housing to said pump; and a clamp plate having a first aperture through which said first tubular assembly extends, a U-shaped second aperture through which said second tubular assembly extends, and a third aperture configured for connecting said clamp plate to said hydraulic housing, wherein said first port for receiving said first tubular assembly and said second port for receiving said second tubular assembly are configured, respectively to receive said first tubular assembly and said second tubular assembly such that said clamp plate fits flush against said housing.

12. The method of claim 1 wherein said step (e) forming a uniform bead around said outer surface of said first tubular portion of said tubular member, and said step (f) expanding a proximal end of said second inner wall portion of said second tubular portion into said third inner wall portion of said second shoulder segment, are formed simultaneously in a second station of said forming machine.

13. A method for assembling an endform tubular assembly in a fluid flow assembly for a power steering system, wherein said fluid flow system comprises a housing for a steering gear, said housing including a first port extending from an outer surface of said housing to an inner surface of said housing and a second port extending from said outer surface of said housing to an inner surface of said housing; a pump; a first tubular assembly having a first end connected to said first port in said housing and a second end attached to said pump, wherein said first tubular assembly conveys fluid under pressure from said pump to said housing; a second tubular assembly having a first end connected to said second port in said housing and a second end connected to said pump wherein said second tubular assembly conveys fluid from said housing to said pump; and a clamp plate having a first aperture through which said first tubular assembly extends, a U-shaped second aperture having an open end through which said second tubular assembly extends, and a third aperture intermediate said first aperture and said second U-shaped aperture, said third aperture configured for connecting said clamp plate to said hydraulic housing, wherein said first port for receiving said first tubular assembly and said second port for receiving said second tubular assembly are configured to receive said first tubular assembly and said second tubular assembly such that said clamp plate fits flush against said housing, said method comprising:

(a) providing a tubular member having a substantially uniform diameter and wall thickness, said tubular member capable of being endformed;

(b) reducing one end of said tubular member in a first station of a forming machine to provide a tubular member having a first tubular portion and a reduced second tubular portion, said first tubular portion having a first diameter, and said reduced second tubular portion having a second diameter;

(c) providing a connector member having an outer surface and an inner surface wherein said inner surface extends longitudinally through said connector member, said connector member comprising:
 (1) a first shoulder segment defining a distal end of said connector member, said first shoulder segment including at least one fixing member integral with said first shoulder portion;
 (2) a second shoulder segment defining a proximal end of said connector member; and
 (3) a brim segment intermediate said first shoulder segment and said second shoulder segment, said brim segment extending perpendicularly from said outer surface of said connector member; wherein said first shoulder segment comprises a first inner wall portion having a first inner surface exhibiting a first diameter; said second shoulder segment comprising a second inner wall portion having a second inner surface exhibiting a second diameter and a third inner wall portion having a third inner surface exhibiting a third diameter, wherein said second diameter is smaller than said first diameter, and said third diameter is larger than said second diameter;

(d) inserting said tubular member into an connector member such that said first tubular portion of said tubular member and said second tubular portion of said tubular member mate with said first inner wall portion of said connector member and said second wall portion of said connector member, respectively;

(e) forming a uniform bead around an outer surface of said first tubular portion of said tubular member in a second station of said forming machine, wherein said uniform bead is in said first shoulder segment of said connector member adjacent said brim segment to prevent longitudinal movement of said tubular member in said connector member;

(f) expanding a proximal end of a second inner wall portion of said second tubular portion into said third inner wall portion of said second shoulder segment, in a third station of said forming machine to provide a tubular member having a first inner wall portion, said second inner wall portion and a third inner wall portion, said reduced second outer diameter having a second inner diameter and a third inner diameter, said third inner wall portion defining a gauge diameter depth in a proximal end of said tubular member;

(g) providing a clamp plate having a substantially flat first surface and a substantially flat second surface wherein said second surface corresponds to said first surface; a first aperture configured to accept a distal end of said connector member; a U-shaped second aperture configured to accept a distal end of a second tubular assembly and a third aperture for accepting a fastener for connecting said fluid flow assembly to said power steering housing;

(h) installing said first tubular assembly onto said clamp plate such that said aperture in said clamp plate receives said first shoulder segment of said connector member to provide a press fit coupling, wherein said clamp plate abuts said brim segment of said connector member;

(i) installing said second tubular assembly onto said clamp plate such that said U-shaped second aperture receives said second tubular assembly securing said second tubular assembly thereto;

(j) installing said clamp plate assembly to said power steering housing employing a single fastener wherein said first tubular assembly engages a first port in said hydraulic housing for receiving pressurized fluid from said pump, and said second tubular assembly engages a second port in said power steering housing for returning said fluid from said housing to said pump;

wherein said clamp plate having said first tubular assembly and said second tubular assembly secured thereto provides a clamp plate assembly;

(k) installing a sealing means on said outer surface of said proximal end of said tubular member adjacent said proximal end of said second shoulder segment; and (l) flaring said proximal end of said tubular member to retain said o-ring thereon.

14. The method of claim 13 wherein said second inner wall portion having a smaller diameter compared to said diameter of said first inner wall portion exhibits an inner concentric reduction angle up to about 90°.

15. The method of claim 14 wherein said second inner wall portion having a reduced diameter compared to said diameter of said first inner wall portion exhibits an inner concentric reduction angle of about 15° to about 60°.

16. The method of claim 13, wherein said second shoulder segment of said connector member has a perpendicular end exhibiting an angle of about 90° with respect to said outer surface of said proximal end of said tubular member.

17. The method of claim 13, wherein said connector member is metal or metal alloy.

18. The method of claim 13, wherein said tubular member is metal or metal alloy.

19. The method of claim 13 wherein said at least one fixing member is a non-uniform surface.

20. The method of claim 19 wherein said non-uniform surface is one or more projections, indentations, grooves, ridges or combinations thereof.

21. The method of claim 13 wherein said step (e) forming a uniform bead around said outer surface of said first tubular portion of said tubular member, and said step (f) expanding a proximal end of said second inner wall portion of said second tubular portion into said third inner wall portion of said second shoulder segment, are formed simultaneously in a second station of said forming machine.

22. In a method for the assembly of a fluid flow assembly in a power steering system wherein first and second tubular members are mounted onto a bracket and the assembly is simultaneously secured to a steering gear, the improvement comprising:

(a) providing a tubular member having a substantially uniform diameter and wall thickness, said tubular member capable of being endformed;

(b) reducing one end of said tubular member in a first station of a forming machine to provide a tubular member having a first tubular portion and a reduced second tubular portion, said first tubular portion having a first diameter, and said reduced second tubular portion having a second diameter;

(c) providing a connector member having an outer surface and an inner surface wherein said inner surface extends longitudinally through said connector member, said connector member comprising:
  (1) a first shoulder segment defining a distal end of said connector member, said first shoulder segment including at least one fixing member integral with said first shoulder segment;
  (2) a second shoulder segment defining a proximal end of said connector member; and
  (3) a brim segment intermediate said first shoulder segment and said second shoulder segment, said brim segment extending perpendicularly from said outer surface of said connector member; wherein said first shoulder segment comprises a first inner wall portion having a first inner surface exhibiting a first diameter; said second shoulder segment comprising a second inner wall portion having a second inner surface exhibiting a second diameter and a third inner wall portion having a third inner surface exhibiting a third diameter, wherein said second diameter is smaller than said first diameter, and said third diameter is larger than said second diameter;

(d) inserting said tubular member into said connector member such that said first tubular portion of said tubular member and said second tubular portion of said tubular member mate with said first inner wall portion of said connector member and said second wall portion of said connector member, respectively;

(e) forming a uniform bead around an outer surface of said first tubular portion of said tubular member in a second station of said forming machine, wherein said uniform bead is in said first shoulder segment of said connector member adjacent said brim segment to prevent longitudinal movement of said tubular member in said connector member;

(f) expanding a proximal end of a second inner wall portion of said second tubular portion into said third inner wall portion of said second shoulder segment in a third station of said forming machine to provide a tubular member having a first inner wall portion, said second inner wall portion and a third inner wall portion, said reduced second outer diameter having a second inner diameter and a third inner diameter, said third inner wall portion defining a gauge diameter depth in a proximal end of said tubular member;

(g) installing a retaining ring on a outer surface of said proximal end of said tubular member adjacent said proximal end of said second shoulder segment;

(h) installing an o-ring on said outer surface of said proximal end of said tubular member, said o-ring configured to mate with said housing to seal said tubular member to said housing;

(i) flaring said proximal end of said tubular member to retain said o-ring thereon;

(j) providing a clamp plate having a substantially flat first surface and a substantially flat second surface wherein said second surface corresponds to said first surface; a first aperture configured to accept said distal end of said connector member; a U-shaped second aperture configured to accept a distal end of a second tubular assembly and a third aperture for accepting a fastener for connecting said fluid flow assembly to said power steering housing;

(k) installing a first tubular assembly onto said clamp plate such that said aperture in said clamp plate receives said first shoulder segment of said connector member to provide a press fit coupling, wherein said clamp plate abuts said brim segment of said connector member;

(l) installing a second tubular assembly onto said clamp plate such that said U-shaped second aperture receives said second tubular assembly securing said second tubular assembly thereto; and (m) installing said clamp plate assembly to said power steering housing employing a single fastener wherein said first tubular assembly engages a first port in said hydraulic housing for receiving pressurized fluid from said pump, and said second tubular assembly engages a second port in said hydraulic housing for returning said fluid from said housing to said pump; wherein said clamp plate having said first tubular assembly and said second tubular assembly secured thereto provides a clamp plate assembly.

23. The fluid flow assembly of claim 22 wherein said second inner wall portion has a reduced diameter compared to said diameter of said first inner wall portion.

24. The method of claim 23 wherein said second inner wall portion having a reduced diameter compared to said diameter of said first inner wall portion exhibits an inner concentric reduction angle up to about 90°.

25. The method of claim 24 wherein said second inner wall portion having a reduced diameter compared to said diameter of said first inner wall portion exhibits an inner concentric reduction angle of about 15° to about 60°.

26. The method of claim 22 wherein said o-ring is formed from a polymeric material selected from the group consisting of nitrile-butadiene rubber, hydrogenated nitrile-butadiene rubber, ethylene-acrylate elastomer, ethylene-vinyl acetate copolymer, acrylic rubber, ethylene methacrylate elastomer, and blends thereof.

27. The method of claim 26 wherein said retaining ring is formed from a polymeric material, a metal or a metal alloy.

28. The method of claim 27 wherein said retaining ring is a tetrafluoroethylene ring.

29. The method of claim 22, wherein said connector member is metal or metal alloy.

30. The method of claim 22, wherein said tubular member is metal or metal alloy.

31. The method of claim 22 wherein said at least one fixing member is a non-uniform surface.

32. The method of claim 31 wherein said non-uniform surface is one or more projections, indentations, grooves, ridges or combinations thereof.

33. The method of claim 22 wherein said step (e) forming a uniform bead around said outer surface of said first tubular portion of said tubular member, and said step (f) expanding a proximal end of said second inner wall portion of said second tubular portion into said third inner wall portion of said second shoulder segment, are formed simultaneously in a second station of said forming machine.

* * * * *

UNITED STATES PATENT AND TRADEMARK OFFICE
CERTIFICATE OF CORRECTION

| | | |
|---|---|---|
| PATENT NO. | : 7,870,655 B2 | Page 1 of 1 |
| APPLICATION NO. | : 11/769316 | |
| DATED | : January 18, 2011 | |
| INVENTOR(S) | : Terence Skiba et al. | |

It is certified that error appears in the above-identified patent and that said Letters Patent is hereby corrected as shown below:

Claim 13, column 13, line 42, change "into an connector" to --into a connector--.

Claim 22, column 15, line 53, change "a outer surface of said" to --an outer surface of a--.

Claim 22, column 15, line 57, change "end of said tubular member" to --portion of said tubular member--.

Signed and Sealed this
First Day of March, 2011

David J. Kappos
*Director of the United States Patent and Trademark Office*